(12) United States Patent
Hyde

(10) Patent No.: US 6,202,959 B1
(45) Date of Patent: Mar. 20, 2001

(54) AIRCRAFT FIN AND RUDDER

(75) Inventor: Leslie L Hyde, Bristol (GB)

(73) Assignee: Bae Systems plc, Farnborough (GB)

( * ) Notice: Subject to any disclaimer, the term of this patent is extended or adjusted under 35 U.S.C. 154(b) by 0 days.

(21) Appl. No.: 09/434,470

(22) Filed: Nov. 5, 1999

Related U.S. Application Data

(63) Continuation of application No. PCT/GB99/02568, filed on Aug. 3, 1999.

(30) Foreign Application Priority Data

Aug. 5, 1998 (GB) .................................................. 9816938

(51) Int. Cl.⁷ ....................................................... B64C 7/00
(52) U.S. Cl. ............................................... 244/87; 244/130
(58) Field of Search ................................... 244/199, 213, 244/214, 215, 48, 87, 130, 91

(56) References Cited

U.S. PATENT DOCUMENTS

| | | |
|---|---|---|
| 1,724,110 * | 8/1929 | Reid ........................................ 244/91 |
| 3,067,971 | 12/1962 | Dew . |
| 4,718,620 | 1/1988 | Braden et al. . |
| 4,736,913 | 4/1988 | Bennett et al. . |
| 4,790,494 | 12/1988 | Kohn . |
| 5,518,210 * | 5/1996 | Friberg ................................. 244/215 |

FOREIGN PATENT DOCUMENTS

| | | |
|---|---|---|
| 0 122 790 | 10/1984 | (EP) . |
| 1570966 | 6/1969 | (FR) . |
| 2 264 679 | 9/1993 | (GB) . |
| 4-78793 * | 7/1990 | (JP) ..................................... 244/199 |

* cited by examiner

Primary Examiner—Galen L. Barefoot
(74) Attorney, Agent, or Firm—Nixon & Vanderhye P.C.

(57) ABSTRACT

The fin 12 has an end plate 16 mounted at its upper end and the end plate covers the upper end of the rudder, so that the rudder 14 seals against the end plate at all rudder deflections. The fin and rudder lift curved slopes are increased by the effect of the end plate 16.

9 Claims, 1 Drawing Sheet

AIRCRAFT FIN AND RUDDER

This application is a continuation of PCT/GB99/02568, filed Aug. 3, 1999.

BACKGROUND OF THE INVENTION

The invention relates to an aircraft fin and rudder and is particularly concerned with an aircraft fin and rudder arrangement which will improve fin and rudder effectiveness.

SUMMARY OF THE INVENTION

According to the invention an aircraft fin and rudder arrangement comprises an end plate at the upper end of the fin, the end plate being arranged to contact or lie closely adjacent the upper end of the rudder at all rudder deflections.

By providing such an end plate, the fin and rudder lift curve slopes are increased and the maximum side force generated by the rudder is increased thereby enabling the size of the fin and rudder to be reduced whilst providing the side force previously achieved by a larger arrangement. That, in turn, is useful in that bending moment at the fin root can be reduced when compared to that of a taller fin for a given side force.

Preferably, the upper end of the rudder seals against the end plate at all rudder deflections. In that way, effectiveness of the rudder is optimised at all deflected positions.

Generally, the rudder will pivot about an inclined hinge. To minimise clearance or maintain sealing contact between the upper end of the rudder and the end plate at all rudder deflections, the end plate preferably has a suitably selected dihedral.

The end plate may have a delta plan form, the delta preferably being slender and preferably having an angle which is no greater than that required to ensure that the upper end of the rudder will remain covered by the end plate at all rudder deflections.

In the preferred embodiment, the end plate has an angular setting relative to the incident airflow to minimise drag thereof in the aircraft cruise condition. In such a case, the end plate may be set at a negative angle (i.e. leading edge down) to the horizontal datum of a fuselage on which the fin is mounted in use. Once the aircraft has a reached a cruising condition, the end plate will normal present a zero angle to the direction of relative air flow thereby minimising drag.

BRIEF DESCRIPTION OF THE DRAWINGS

An aircraft fin and rudder in accordance with the invention will now be described by way of example with reference to the accompanying drawings in which.

DETAILED DISCUSSION OF PREFERRED EMBODIMENTS

Figure 1:
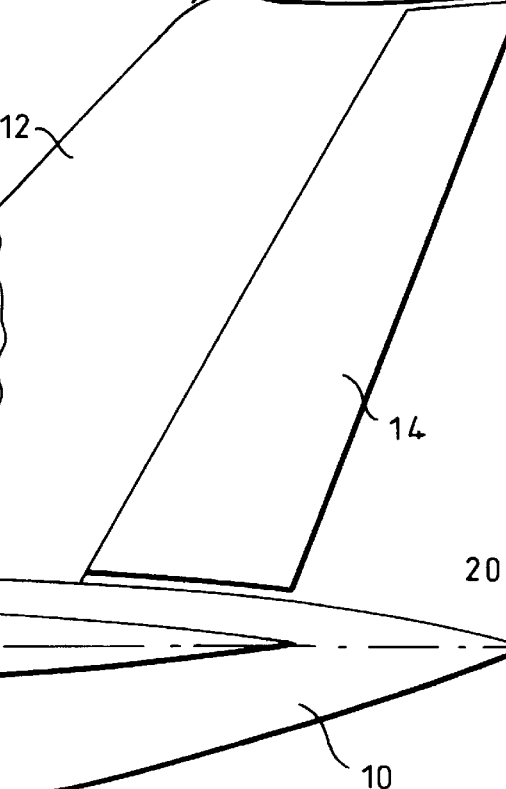
FIG. 1 shows a side view of a fin and rudder arrangement in accordance with the invention shown partly broken away.
Figure 2:
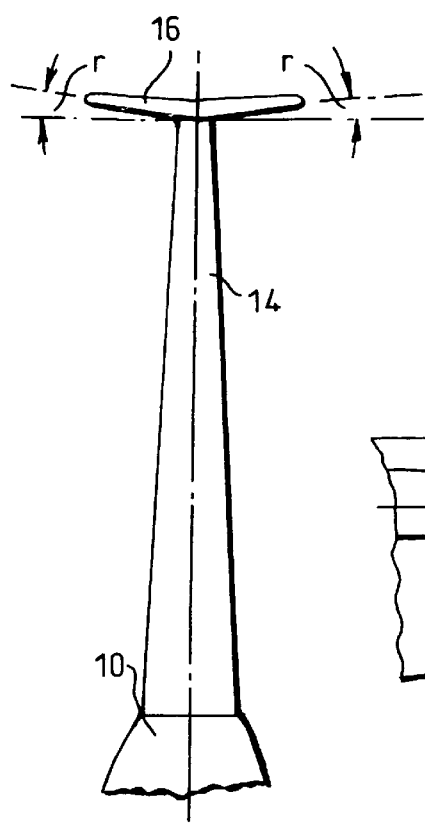
FIG. 2 is a rear end view of the fin and rudder shown in FIG. 1.

A fuselage 10 carries a fin 12 at its rear end and a rudder 14 is hinged to the fin 12 in known manner.

The upper end of the fin 12 carries a delta-shape end plate 16 which has a dihedral angle of Γ. The end plate 16 has a chord line 18 which is inclined at an angle to a horizontal datum 20 of the fuselage 10, for example by −2 degrees.

Figure 3:
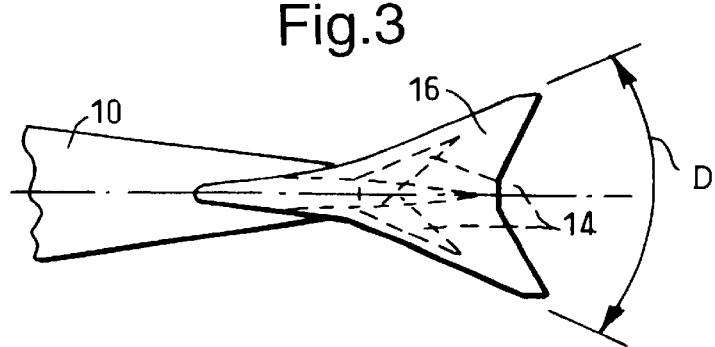
FIG. 3 is a plan view of the fin and rudder showing the delta shape of the end plate.

The upper end of the rudder 14 lies closely adjacent the underside of the end plate 16 and is preferably in sealing contact therewith. The selected dihedral angle G ensures that the upper end of the rudder remains in sealing contact with the end plate when being deflected about its inclined hinge line. It will be noted from FIG. 3 that an angle D between leading edges of the end plate 16 is sufficient to ensure that end plates 16 will cover the rudder 14 at all rudder deflections as indicated by broken lines in FIG. 3.

By using the fin construction shown, the fin and rudder lift curve slopes will be increased thereby enabling the fin and rudder to provide a lift curve slope equivalent to a larger fin 12a as indicated in broken lines in FIG. 1, with minimum change in overall wetted area (i.e. the surface area exposed to the airflow). Alternatively, the size of the fin and rudder can be reduced to provide the same lift as previously achieved by a larger arrangement.

The use of the end plate 16 improves the longitudinal stability of the aircraft and aircraft stall characteristics are improved due to nose-down pitch from the end plate which will increase non-linearly with incidence.

The end plate itself is highly stall resistant because the highly swept back leading edge generates a leading edge vortex flow which maintains lift on the end plate up to high angles of attack. In a pushover manoeuvre (i.e. when the joystick is pushed forward) which results in a negative angle of attack, the end plate will provide a pitching moment at an angle of attack greater than that for tailplane stall.

The effect of the end plate will also reduce the induced drag of the fin in the engine out condition and will also act as a lightning conductor and shield the rudder from lightning strikes which can damage components such as rudder actuators, hydraulic pipes and rudder hinges.

As the use of the end plate 16 effectively enables the height of the fin to be reduced, there will be a reduction in fin root bending moment for a given side force compared to that when using the taller fin 12a shown in broken lines.

What is claimed is:

1. An aircraft vertical fin and rudder, the fin 12 having an endplate 16 at its upper end which covers the upper end of the rudder 14 and which lies at least closely adjacent thereto at all rudder deflections.

2. An aircraft fin and rudder according to claim 1 in which the upper end of the rudder 14 seals against the end plate 16 at all rudder deflections.

3. An aircraft fin and rudder according to claim 1 in which the end plate 16 has a dihedral Γ selected to minimise clearance or maintain sealing contact between the upper end of the rudder 14 and the end plate 16 at all rudder deflections.

4. An aircraft fin and rudder according to claim 1 in which the end plate 16 has an delta plan form.

5. An aircraft fin and rudder according to claim 1 in which the end plate 16 has an angular setting to minimise drag thereof in the aircraft cruise condition.

6. An aircraft fin and rudder according to claim 5 in which the end plate 16 is set at a negative angle to the horizontal datum 20 of a fuselage 10 on which the fin is mounted in use.

7. An aircraft empennage including a fin 12 and rudder 14 according claim 1.

8. An aircraft having a fin 12 and rudder 14 according to claim 1.

9. An aircraft according to claim 8 having a tail plane mounted on the fin or fuselage.

* * * * *